US008543935B2

(12) United States Patent
Duffy

(10) Patent No.: US 8,543,935 B2
(45) Date of Patent: Sep. 24, 2013

(54) FULL-SCREEN HETEROGENEOUS DESKTOP DISPLAY AND CONTROL

(75) Inventor: Maureen Emily Duffy, Somerville, MA (US)

(73) Assignee: Red Hat, Inc., Raleigh, NC (US)

( * ) Notice: Subject to any disclaimer, the term of this patent is extended or adjusted under 35 U.S.C. 154(b) by 1115 days.

(21) Appl. No.: 12/195,196

(22) Filed: Aug. 20, 2008

(65) Prior Publication Data
US 2010/0050111 A1 Feb. 25, 2010

(51) Int. Cl.
*G06F 3/048* (2006.01)

(52) U.S. Cl.
USPC ............ 715/778; 715/779; 715/764; 715/781

(58) Field of Classification Search
USPC .................. 715/778, 781, 717, 718, 764, 779
See application file for complete search history.

(56) References Cited

U.S. PATENT DOCUMENTS

| | | | | |
|---|---|---|---|---|
| 5,072,412 A * | 12/1991 | Henderson et al. | ........... | 715/804 |
| 5,564,002 A * | 10/1996 | Brown | ........... | 715/778 |
| 5,841,435 A * | 11/1998 | Dauerer et al. | ........... | 715/775 |
| 6,212,564 B1 * | 4/2001 | Harter et al. | ........... | 709/228 |
| 6,710,788 B1 * | 3/2004 | Freach et al. | ........... | 715/778 |
| 6,807,666 B1 * | 10/2004 | Evans et al. | ........... | 718/108 |
| 7,246,374 B1 * | 7/2007 | Simon et al. | ........... | 726/16 |
| 2003/0065676 A1 * | 4/2003 | Gbadegesin et al. | ........... | 707/104.1 |
| 2003/0179240 A1 * | 9/2003 | Gest | ........... | 345/779 |
| 2003/0189597 A1 * | 10/2003 | Anderson et al. | ........... | 345/778 |
| 2003/0217287 A1 * | 11/2003 | Kruglenko | ........... | 713/200 |
| 2004/0226041 A1 * | 11/2004 | Smith et al. | ........... | 725/43 |
| 2006/0168537 A1 * | 7/2006 | Hochmuth et al. | ........... | 715/778 |
| 2007/0050727 A1 * | 3/2007 | Lewis-Bowen et al. | ........... | 715/779 |
| 2007/0101435 A1 * | 5/2007 | Konanka et al. | ........... | 726/27 |
| 2008/0126978 A1 * | 5/2008 | Bai et al. | ........... | 715/778 |
| 2008/0201659 A1 * | 8/2008 | Shen | ........... | 715/778 |
| 2009/0204925 A1 * | 8/2009 | Bhat et al. | ........... | 715/778 |

OTHER PUBLICATIONS

Parallels Workstation User Guide; Copyright 2005-2008 Parallels Software International, Inc.; 225 pages.
Parallels Desktop for Mac; Copyright 2005-2007 by Parallels Software INternational, Inc.; 284 pages.

* cited by examiner

*Primary Examiner* — Weilun Lo
*Assistant Examiner* — Rashedul Hassan
(74) *Attorney, Agent, or Firm* — Lowenstein Sandler LLP

(57) ABSTRACT

Described herein is a method and apparatus for generating and managing multiple desktops. The desktops can be tied to virtual software environments, remote desktops, separate user account desktops, shared desktops, full screen applications or similar sources. The desktops are managed through a desktop management interface that displays a scale image of each current desktop. The desktops can also be marked by type in the interface. The desktop management system queries a user during start-up for each program to determine whether a new desktop is to be generated for the program. The desktop management system also manages the switching between the available desktops.

21 Claims, 6 Drawing Sheets

FULL-SCREEN HETEROGENEOUS DESKTOP DISPLAY AND CONTROL

TECHNICAL FIELD

Embodiments of the present invention relate to a method and system for desktop management. Specifically, the embodiments of the present invention relate to a method and system for generating and managing multiple full screen applications or desktops.

BACKGROUND

On many platforms such as Linux® or Windows® by Microsoft Corp of Redmond, Wash. the operating system offers a desktop. The desktop is a graphical user interface where icons and menus are presented that allow access to files and programs for a particular computer system. In addition, executing programs are placed in windows that are also displayed and managed on the desktop. Some programs that require full screen viewing are excepted from display on a desktop and must be displayed by replacing the desktop.

Some platforms provide utilities or functionality that allow for the management of multiple desktops. These utilities allow for the creation of multiple desktops and the selection of one of these desktops for display. Windows and icons can be assigned to specific desktops or moved between them. Some of these utilities provide a graphical user selection mechanism to choose a desktop for display. An example of a desktop manager is Spaces™ by Apple, Inc. of Cupertino, Calif.

Virtualization software provides desktop switching functionality. The main purpose of the virtualization software is to provide access to one software environment or platform in another software environment or platform. The virtualization software allows for the virtualized software environment or platform to be displayed full screen. Examples of this software include Parallels™ Workstation, by Parallels, Inc. of Switzerland and VMware™ Fusion by VMware, Inc. of Palo Alto, Calif.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Described herein is a method and apparatus for generating and managing multiple desktops. The desktops can be tied to virtual software environments, remote desktops, separate user account desktops, shared desktops, full screen applications or similar sources. The desktops are managed through a desktop management interface that displays a scale image of each current desktop status. The desktops can also be marked by type in the interface. The desktop management system queries a user during start-up for each source to determine whether a new desktop is to be generated for the source. The desktop management system also manages the switching between the available desktops.

Figure 1:
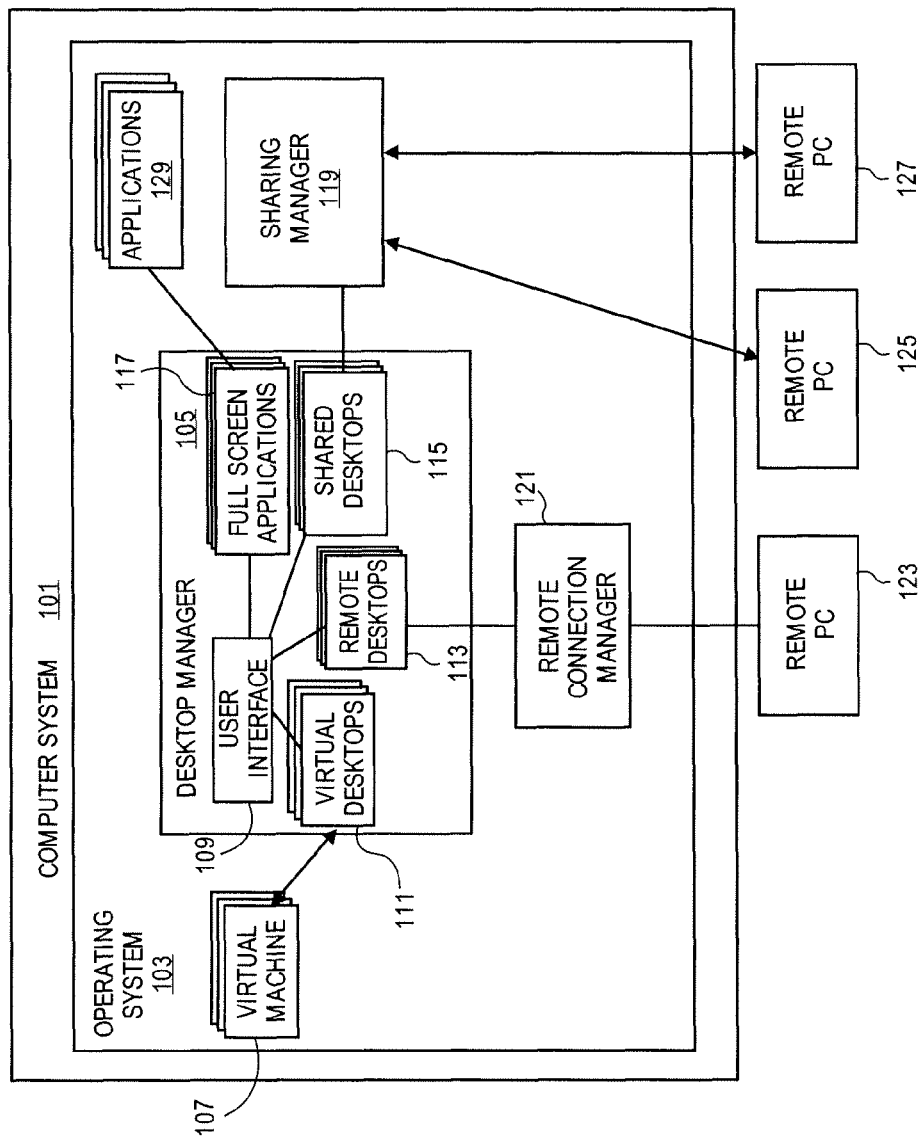
FIG. 1 is a diagram of one embodiment of a system for desktop management.

FIG. 1 is a diagram of one embodiment of a system for desktop management. The system includes a computer system 101. The computer system 101 can be a desktop computer, laptop computer, dedicated server, handheld device, wireless device, console device or similar computer system. The computer system 101 executes at least one operating system (OS) 103. Any type of operating system 103 can be supported including various distributions of Linux, such as Fedora® by Red Hat, Inc. of Raleigh, N.C., Mac OS by Apple, Inc. of Cupertino, Calif., Windows® by Microsoft of Redmond, Wash. or similar operating systems. The operating system 103 provides a software environment in which one embodiment of the desktop manager 105 and related programs operate.

The desktop manager 105 can interact with other applications and programs executing on the computer system 101 or in communication with the computer system 101. Remote computers 123, 125, 127 can be in communication with the computer system 101 over a network or similar communication medium. The network can be any type of wired or wireless network. The network can be a local area network (LAN), wide area network (WAN), such as the Internet, or similar network. The network can be a wired or wireless network or any combination thereof.

The desktop manager 105 can interact with and provide desktops for multiple sources. The sources can include remote applications, local applications 129, sharing programs 119, virtual machines 107, remote platforms 123 or similar desktop sources. Each of the sources can be managed by a separate module of the desktop manager 105. A separate instance of each module can manage each source of the same type. The desktop manager 105 can interact and support desktops for any number of different desktop sources simultaneously.

Desktops for applications 129 can be handled by a full screen application module 117. Most applications 129 are windowed and some are full screen applications. Each windowed application can be assigned to a separate desktop or any existing desktop shared with other windowed applications. Full screen applications can also be assigned a designated desktop or a slot in the desktop management interface similar to a desktop slot.

A desktop or application user interface can also be shared as a separate desktop or on a separate desktop through the desktop manager 105. The shared desktop module 115 can interact with an external sharing manager 119 or similar application that manages the communication of data between the computer system 101 and remote computers 125, 127 that are sharing a designated desktop or application.

Similarly, the desktop manager 105 can support desktops tied to remote applications, terminal emulation, remote desktops or similar remote sources. The transmission of data between the remote computer 123 and the computer system 101 is managed by a remote connection manager 121. The remote connection manager 121 can use any communication protocol or system to exchange data with the remote computer system 123. The desktop manager 105 can include a remote desktop module 113 to manage the exchange of data between the remote connection manager 121 and the desktop manager. Any number of remote desktops can be supported simultaneously.

A virtual machine 107 can be another source for desktops for the desktop manager 105. A virtual desktop module 111 interacts with the virtual machine 107 to gather data necessary for display of the virtual machine 107 in a windowed desktop or a separate desktop provided by the desktop manager 105. A virtual machine 107 executes a non-native platform on the computer system such as an operating system that is designed for another type of hardware architecture. The virtual desktop module 111 of the desktop manager 105 allows each virtual machine 107 to be treated as a discrete desktop. A virtual machine can also be hosted on a remote computer through a remote hypervisor or similar system. The remote virtual machine interacts with the virtual desktop module 111 and/or the remote desktop module 113. In addition, virtual machines 107 can support multiple desktops. These virtual machine desktops can be separately managed or the management can be integrated with the desktop manager and included in the user interface 109.

The desktop manager 105 can also include a user interface component 109. The user interface component 109 provides a graphical user interface for selection and viewing of the available desktops. In one embodiment, the graphical user interface provided by the component 109 is a panel composed of individual scaled representations of each available desktop. In other embodiments, any graphical representation or organization of the available desktops can be graphically presented to allow selection of a user desired desktop. The user interface component 109 can also generate interactive queries during source initialization that allows a user to select to create a new desktop or add the source to an existing desktop. Source initialization can be application start-up, remote desktop or application synchronization, virtual machine start-up or similar source initialization activities.

Figure 2:
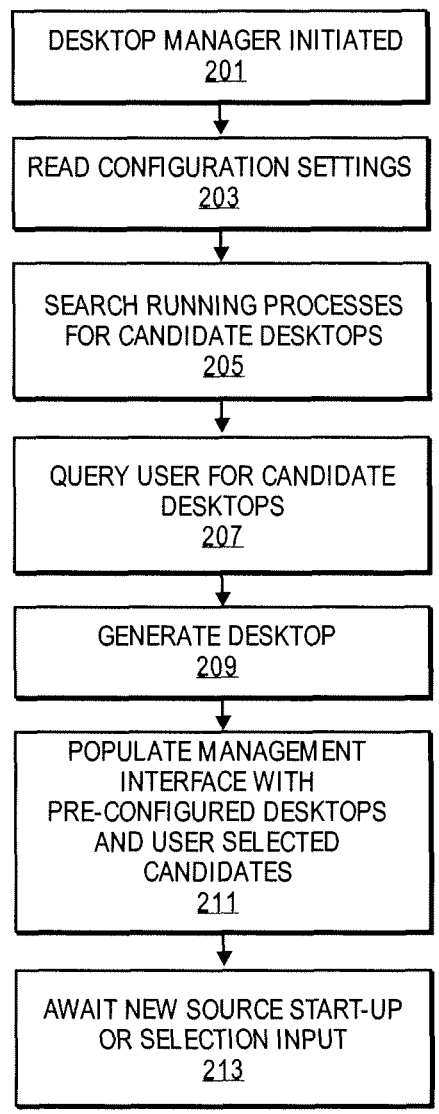
FIG. 2 is a flowchart of one embodiment of a process for initializing the desktop management.

FIG. 2 is a flowchart of one embodiment of a process for initializing the desktop manager. The initialization of the desktop manager can occur during computer system start-up or in response to a user command or graphical user interface selection (block 201). The desktop manager can read a configuration file that is locally or remotely stored to determine an initial layout and configuration of desktops (block 203). The configuration information can be stored in any location and in any format (e.g., the configuration information can be stored in an extensible markup language (XML) format or similar format). The configuration information can indicate any number of desktops to be created and assign any set of sources to separate desktops or windows within these desktops. A 'set,' as used herein, refers to any whole number of items including one item.

The desktop manager can also search for processes that are executing at the time of initialization (block 205). Each running process that has a graphical user interface can be assigned to a desktop based on configuration information or default assignments can be made to a specific desktop or set of desktops. The desktop manager can also query a user as to which running processes are to be assigned to existing desktops and for which processes a new desktop is to be created (block 207).

The desktop manager and its user interface component generate a desktop panel or similar graphical user interface element that enables a user to view a scale representation of each available desktop and select a desktop to be the currently displayed desktop (block 209). The panel can have any layout including a simple two-dimensional grid layout, a three-dimensional carousel layout, a tiled layout, a layered layout or similar layout. A mouse-over of a desktop in the user selection interface can also initiate a zoom, textual overlay or description or similar feature that enhances the ability of the user to identify each desktop. As the user selection interface (e.g., the panel) is created it is then populated with the existing desktops defined by the configuration information and the user selections (block 211).

The desktop manager then awaits further updates in the configuration information, user input or program start-up (block 213). Any number of desktops can be supported by the desktop manager. The desktops can be rearranged by drag and drop or similar techniques. Desktops can be closed through the desktop manager interface. Windows and similar elements can also be moved from one desktop to another by drag and drop or similar techniques.

Figure 3:
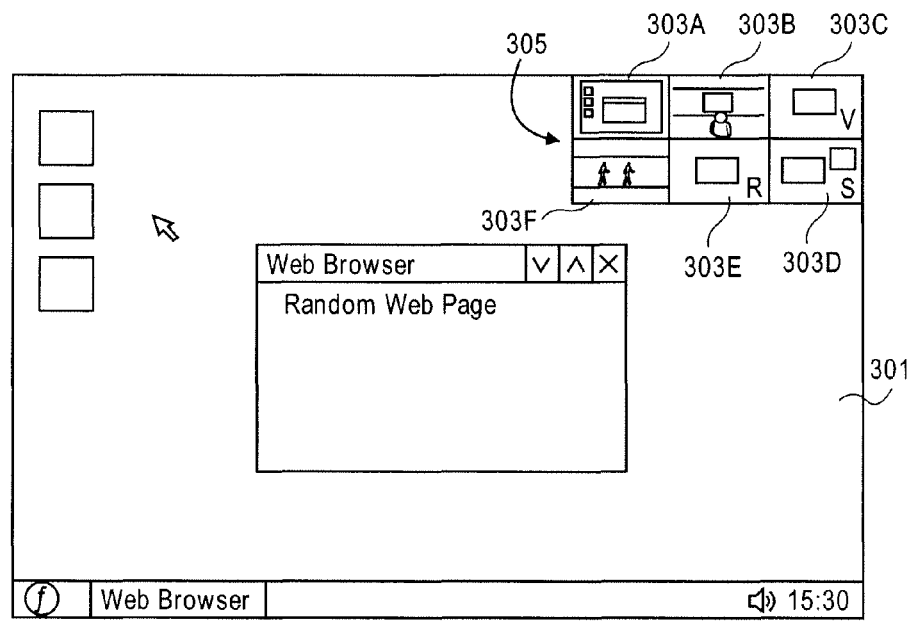
FIG. 3 is a diagram of one embodiment of a desktop management interface.

FIG. 3 is a diagram of one embodiment of a desktop management interface. This illustration is an example of a desktop environment 301. The desktop environment 301 includes a user selection interface 305 in a panel format. The panel includes six separate desktops 303A-F. Each desktop in the example has a different source. The desktop panels 303A-F illustrate the scaled representations of each of the desktops that are available through the user interface.

The representations of each desktop can be any size or shape. The scaling can minimize and simplify the available desktops using any type of scaling or simplifying algorithms. The representations can be periodically updated thumbnail images or full motion video that is continuously updated. In another embodiment, any set of the desktops can also be represented as an icon or similar graphical representation. The icon can be static or animated and include symbols or text that provide descriptive information about the related desktop.

Panel 303A is a scaled representation of the currently selected desktop 301. The currently selected desktop can be highlighted, differently colored or saturated, or similarly distinguished from the other panels. Other panels illustrate a full screen application 303B, 303F (a video game and video playback application, respectively), desktops from a virtual machines 303C, a desktop from a shared application 303D, and a desktop from a remote computer 303E. Each panel may be marked with a symbol or text that describes or indicates the source of a desktop. For example, a desktop for a virtual machine can be marked with a 'V' or 'VM' while a desktop for a remote machine or application can be marked with an 'R' or 'Remote.'

In one embodiment, the full screen video 303F can originate from a television, cable, satellite or similar tuner that is internal or external to the computer system. Similarly, multiple-screens including multiple monitors and combinations with televisions or other display devices can be managed or assigned through the desktop management interface. Each desktop can be assigned to a specific output display by any type of selection mechanism such as a drop down menu, hot keys or similar interface and/or selection mechanism. Output display selections can be displayed by numbers or similar descriptors through the desktop management interface.

Figure 4:
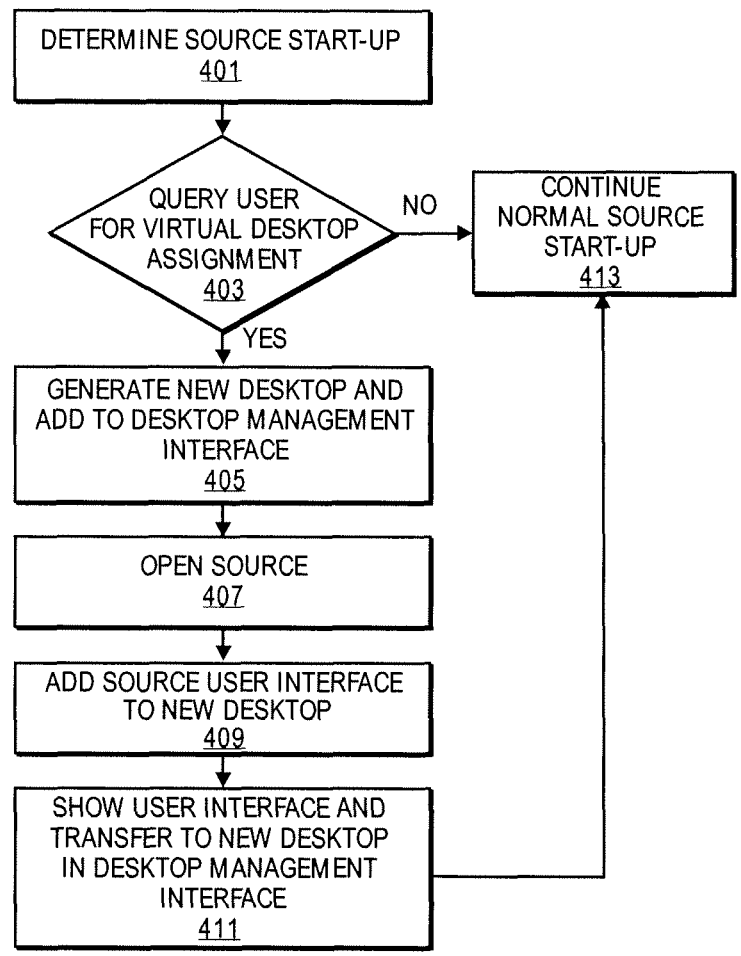
FIG. 4 is a flowchart of one embodiment of a computer system for assigning a source to a desktop.

FIG. 4 is a flowchart of one embodiment of a computer system for assigning a source to a desktop. In one embodiment, the desktop manager is a process that monitors for new desktop sources including newly started processes, newly connected remote machines, newly networked or shared applications and similar sources. The desktop manager can detect potential candidates for new desktops by interaction with the operating system to detect the start of new processes and identifying the type of process associated with those processes (block 401). The different types of processes that can be assigned to separate desktops can be determined by a programmer or configured by a user.

In response to detecting a process or source that is a candidate for a separate desktop assignment or assignment to an existing desktop, the desktop manager generates an interactive query (block 403). The query solicits input from a user or starting process to determine whether the new process should be assigned to a new desktop or an existing desktop. In another embodiment, if a user fails to respond or if a configuration file exists then the process or source may be assigned to a desktop or given a new desktop based on a default setting or a configuration setting.

If a desktop assignment or new desktop is not selected by a user, then the process or source continues its normal start-up and the desktop manager monitors for the next process initialization or source connection (block 413). A process or process with a graphical user interface can be assigned to a currently selected desktop as a default. If the user does select to start a new desktop or assign the source to an existing desktop, then the desktop manager generates a new panel or similar representation in the desktop management interface for the new desktop or updates an existing desktop management interface panel to reflect the change (block 405).

The new source continues execution and is displayed as a scaled representation (block 407). This creates a new source user interface in the new desktop that is specific to the type of the source (block 409). In one embodiment, the new source opens in the current desktop and is automatically moved or minimized to the appropriate new desktop or assigned existing desktop with a graphical movement or animation of the source moving to the panel to assist the user in understanding where the new source can be accessed (block 411).

Figure 5:
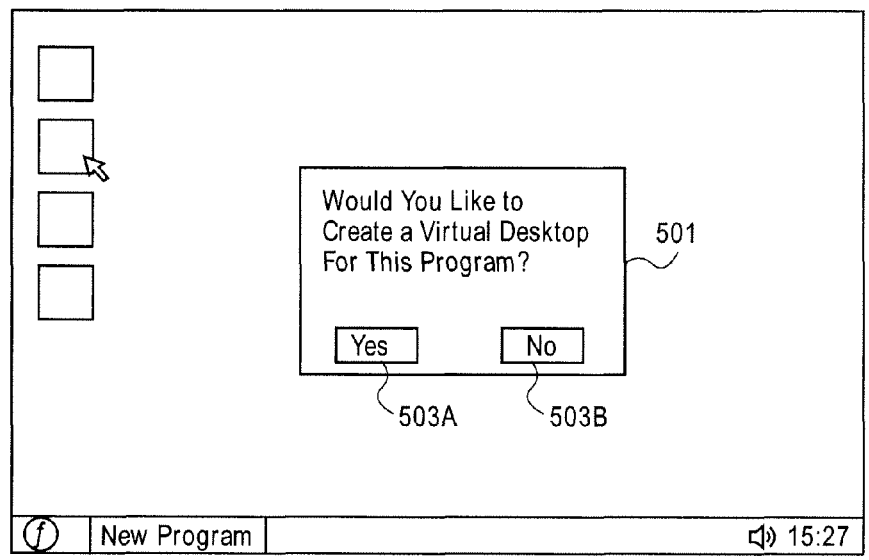
FIG. 5 is a diagram of one embodiment of a query interface for assigning a source to a desktop.

FIG. 5 is a diagram of one embodiment of a query interface for assigning a source to a desktop. The query interface 501 can be any type of pop-up box, dialog box, overlay or similar graphical user interface with interactive features. The query interface 501 presents the user with a set of options 503A, 503B for designating whether the opening source is to be assigned to a new desktop or existing desktop. The query interface 501 can also present additional options including a list of the existing desktops, default action information, configuration update options (e.g., an option to save the selected setting) or similar options.

Figure 6:
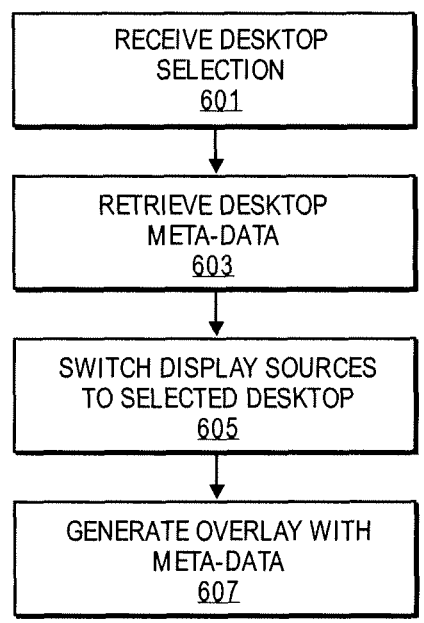
FIG. 6 is a flowchart of one embodiment of a process for switching between multiple desktops.

FIG. 6 is a flowchart of one embodiment of a process for switching between multiple desktops. The switching process is initiated in response to a user selection received through the desktop management interface (block 601). The selection can be through a mouse or peripheral input device click on a desktop, through the use of hot keys or through similar selections mechanisms. The desktop manager then retrieves the information that it has stored related to the selected desktop (block 603). The desktop manager tracks relevant data regarding the desktop such as a description of the source, the type of source and similar information. This source meta-data is utilized to mark the representation of the source in the desktop management interface. For example, the meta-data can identify a source as from a virtual machine, remote computer, shared application or similar source.

The currently displayed desktop is then switched to the selected desktop and the desktop management interface is updated to reflect the change (block 605). The desktop management interface may also be redrawn on the now currently displayed desktop. In another embodiment, the desktop management interface is persistent across all or some of the desktops. In a further embodiment, for certain desktop types the desktop management interface can be hidden and exposed by a mouse over, hot key or similar input. After the source has been switched for the currently displayed desktop, an overlay is generated and displayed providing meta-data information about the new current desktop. The overlay can be a textual or graphical overlay providing information such as a description, title or similar information that identifies the desktop or source associated with the desktop to facilitate the user verification that the correct desktop has been selected.

Figure 7:
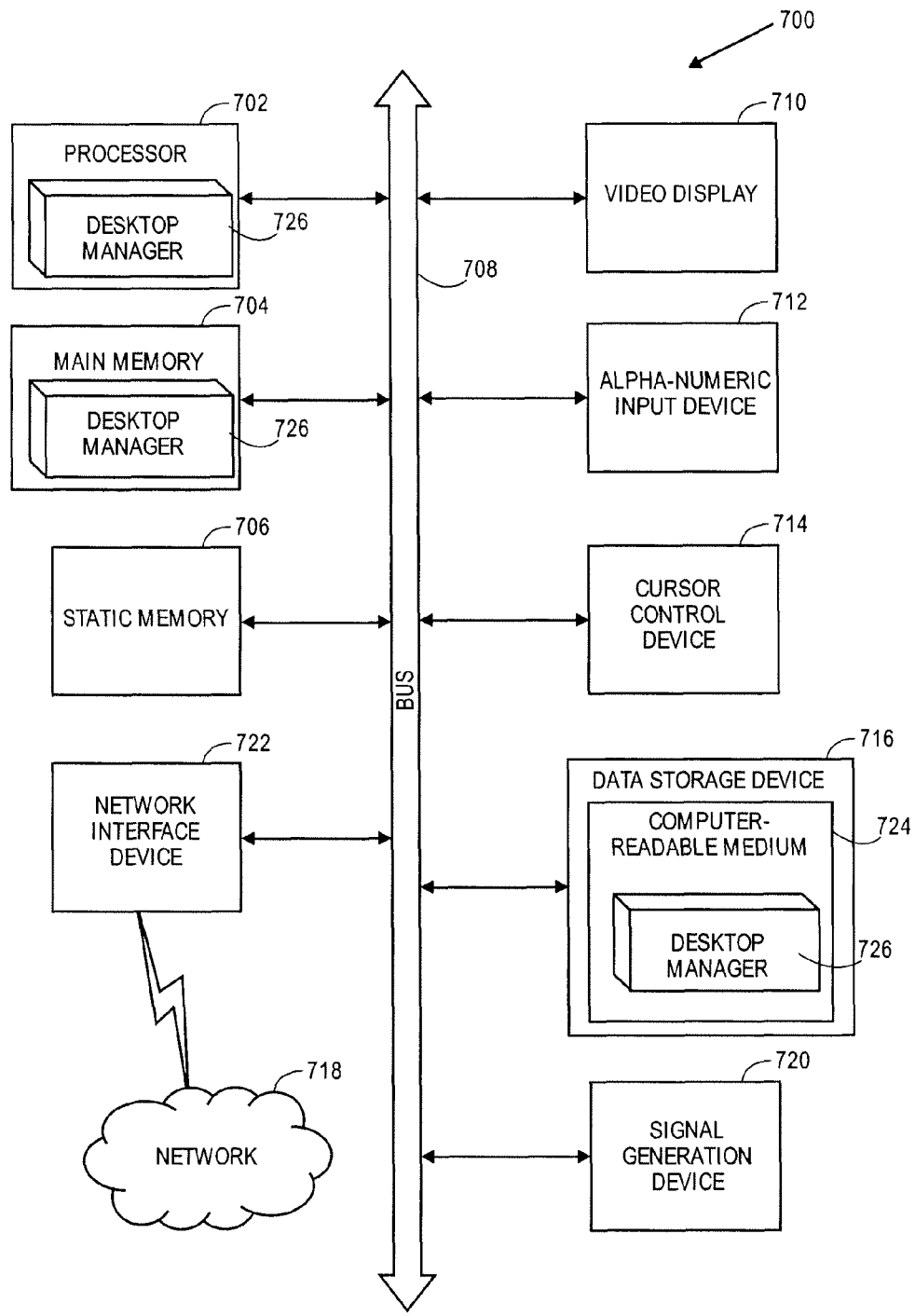
FIG. 7 is a diagram of one embodiment of a computer system for desktop management.

FIG. 7 is a diagram of one embodiment of a computer system for desktop management. Within the computer system 700 is a set of instructions for causing the machine to perform any one or more of the methodologies discussed herein. In alternative embodiments, the machine may be connected (e.g., networked) to other machines in a LAN, an intranet, an extranet, or the Internet. The machine may operate in the capacity of a server or a client machine (e.g., a client computer executing the desktop management program and the server computer executing the a remote application) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 700 includes a processor 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a secondary memory 716 (e.g., a data storage device in the form of a drive unit, which may include fixed or removable computer-readable medium), which communicate with each other via a bus 708.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 702 may also be one or more special-purpose processing devices such as an application specific integrated circuit (ASIC), a field programmable gate array (FPGA), a digital signal processor (DSP), network processor, or the like. Processor 702 is configured to execute the desktop manager 726 for performing the operations and steps discussed herein.

The computer system 700 may further include a network interface device 722. The computer system 700 also may include a video display unit 710 (e.g., a liquid crystal display (LCD) or a cathode ray tube (CRT)) connected to the computer system through a graphics port and graphics chipset, an alphanumeric input device 712 (e.g., a keyboard), a cursor control device 714 (e.g., a mouse), and a signal generation device 720 (e.g., a speaker).

The secondary memory 716 may include a machine-readable storage medium (or more specifically a computer-readable storage medium) 724 on which is stored one or more sets of instructions (e.g., the desktop manager 726) embodying any one or more of the methodologies or functions described herein. The desktop manager 726 may also reside, completely or at least partially, within the main memory 704 and/or within the processing device 702 during execution thereof by the computer system 700, the main memory 704 and the processing device 702 also constituting machine-readable storage media. The desktop manager 726 may further be transmitted or received over a network 718 via the network interface device 722.

The machine-readable storage medium 724 may also be used to store the desktop manager 726 persistently. While the machine-readable storage medium 726 is shown in an exemplary embodiment to be a single medium, the term "machine-readable storage medium" and also "computer-readable medium" should be taken to include a single medium or multiple media (e.g., a centralized or distributed database, and/or associated caches and servers) that store the one or more sets of instructions. The terms "machine-readable storage medium" and "computer-readable medium" shall also be taken to include any medium that is capable of storing or encoding a set of instructions for execution by the machine and that cause the machine to perform any one or more of the methodologies of the present invention. The terms "machine-readable storage medium" and "computer-readable medium" shall accordingly be taken to include, but not be limited to, solid-state memories, and optical and magnetic media.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "generating," "assigning," "populating," "displaying," "retrieving," "switching," "moving," "marking," or the like, refer to the actions and processes of a computer system, or similar electronic computing device that manipulates and transforms data represented as physical (electronic) quantities within the computer system's registers and memories into other data similarly represented as physical quantities within the computer system memories, registers or other such information storage, transmission or display devices.

The present invention also relates to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, Flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A computer readable medium includes any mechanism for storing information in a form readable by a computer. For example, a computer readable medium includes read only memory ("ROM"), random access memory ("RAM"), magnetic disk storage media; optical storage media, flash memory devices or other type of machine-accessible storage media.

Thus, a method and apparatus for desktop management has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

The invention claimed is:

1. A computer-implemented method comprising:
   determining, by a computing device, that a source is initializing, wherein the source is a candidate for display via a desktop graphical user interface (GUI) of the computing device;
   querying, by a desktop manager of an operating system (OS) of the computing device, a user of the computing device during the initialization of the source to determine, whether the source is assigned to an existing desktop GUI managed by the desktop manager;
   when the user indicates that the source is not assigned to an existing desktop GUI, generating a new desktop GUI on the computing device for the source; and
   assigning the new desktop GUI for the source to a user interface element in a desktop management interface provided by the desktop manager, the user interface element providing representations for a plurality of desktop GUIs provided on the computing device including the new desktop GUI for the source.

2. The computer-implemented method of claim 1, further comprising:
   populating the desktop management interface with executing processes based on configuration data.

3. The computer-implemented method of claim 1, further comprising:
   displaying an overlay for the new desktop GUI that provides a description of the new desktop GUI.

4. The computer-implemented method of claim 1, further comprising:

displaying a scaled version of the new desktop GUI through the desktop management interface.

5. The computer-implemented method of claim 1, further comprising:
retrieving meta-data for the new desktop GUI.

6. The computer-implemented method of claim 1, further comprising:
automatically switching to the new desktop GUI in response to user selection of an element of the desktop management interface.

7. The computer-implemented method of claim 1, further comprising:
moving the new desktop GUI or source to the desktop management interface using an animation.

8. The computer-implemented method of claim 1, further comprising:
generating a query window during source initialization to obtain the desktop data.

9. The computer-implemented method of claim 1, further comprising:
marking desktops in the desktop management interface with an indicator for at least any one of a virtual, a remote or a full screen desktop.

10. A non-transitory computer readable storage medium, having instructions stored therein, which when executed, cause a computer to perform a set of operations comprising:
determining, by a computing device, that a source is initializing, wherein the source is a candidate for display via a desktop graphical user interface (GUI) of the computing device;
querying, by a desktop manager of an operating system (OS) of the computing device, a user of the computing device during the initialization of the source to determine whether the source is assigned to an existing desktop GUI managed by the desktop manager;
when the user indicates that the source is not assigned to an existing desktop GUI, generating a new desktop GUI on the computing device for the source; and
assigning the new desktop GUI for the source to a user interface element in a desktop management interface provided by the desktop manager, the user interface element providing representations for a plurality of desktop GUIs provided on the computing device including the new desktop GUI for the source.

11. The computer readable storage medium of claim 10, having further instructions therein, which when executed, cause the computer to perform a further set of operations, further comprising:
populating the desktop management interface with executing processes based on configuration data.

12. The computer readable storage medium of claim 11, having further instructions therein, which when executed, cause the computer to perform a further set of operations, further comprising:
marking desktops in the desktop management interface with an indicator for at least any one of a virtual, a remote or a full screen desktop.

13. The computer readable storage medium of claim 10, having further instructions therein, which when executed, cause the computer to perform a further set of operations, further comprising:
displaying an overlay for the new desktop GUI that provides a description of the new desktop GUI.

14. The computer readable storage medium of claim 10, having further instructions therein, which when executed, cause the computer to perform a further set of operations, further comprising:
displaying a scaled version of the new desktop GUI through the desktop management interface.

15. The computer readable storage medium of claim 10, having further instructions therein, which when executed, cause the computer to perform a further set of operations, further comprising:
retrieving meta-data for the new desktop GUI.

16. The computer readable storage medium of claim 10, having further instructions therein, which when executed, cause the computer to perform a further set of operations, further comprising:
automatically switching to the new desktop GUI in response to user selection of an element of the desktop management interface.

17. The computer readable storage medium of claim 10, having further instructions therein, which when executed, cause the computer to perform a further set of operations, further comprising:
moving the new desktop GUI or source to the desktop management interface using an animation.

18. The computer readable storage medium of claim 10, having further instructions therein, which when executed, cause the computer to perform a further set of operations, further comprising:
generating a query window during source initialization to obtain the desktop data.

19. A system comprising:
a processing device;
a system memory coupled to the processing device; and
a desktop management module executed from the system memory by the processing device, the desktop management module configured to:
determine that a source is initializing, wherein the source is a candidate for display via a desktop graphical user interface (GUI) of the computing device;
query a user of the computing device during the initialization of the source to determine whether the source is assigned to an existing desktop GUI managed by the desktop manager;
when the user indicates that the source is not assigned to an existing desktop GUI, generate a new desktop GUI on the computing device for the source; and
assign the new desktop GUI for the source to a user interface element in a desktop management interface provided by the desktop manager, the user interface element providing representations for a plurality of desktop GUIs provided on the computing device including the new desktop GUI for the source.

20. The system of claim 19, wherein the desktop management module is further configured to interface with a remote connection manager to generate a remote desktop.

21. The system of claim 20, wherein the desktop management module is further configured to interface with a sharing manager to generate a shared desktop.

* * * * *